June 14, 1966 J. R. DE HAAN 3,255,929
HERBICIDE APPLICATOR
Filed Aug. 24, 1964

INVENTOR.
BY James R. De Haan

United States Patent Office 3,255,929
Patented June 14, 1966

3,255,929
HERBICIDE APPLICATOR
James R. De Haan, Rte. 3, Box 303B, Boulder, Colo.
Filed Aug. 24, 1964, Ser. No. 391,502
15 Claims. (Cl. 222—176)

My invention relates to a method and a device for applying a selective herbicide to a given area without the danger of damaging nearby desirable plants.

Selective herbicides have the ability to kill or destroy plants of a certain type with which they come in contact while not harming other types of weeds which they contact. A well-known family of herbicides consists of 2,4,D (2,4-dichlorophenoxy acetic acid) and its derivatives which have the ability to kill most broadleaf plants while doing little or no damage to narrow leafed or grass type plants such as bluegrass, oats, wheat, rye, and corn.

A common desired use of this herbicide is to kill broadleaf weeds or other broadleaf plants which appear in lawns. The usual method of accomplishing this with a weed killer such as 2,4,D is to spray a solution of this material on the lawn to be treated. This method, however, generally entails the risk of some spray falling onto nearby broadleaf plants which frequently surround lawns and which one prefers not to kill. Such desired plants would include plants in flower beds, hedges, and other shrubbery. This risk is particularly great when there is any movement of the air such as a slight breeze since under such conditions the spraying operator loses control of the direction of the spray once it has left the nozzle.

It is the object of this invention to provide a means of applying such selective herbicide to desired areas while at the same time eliminating or greatly reducing the hazard of applying the herbicide to valuable desired plants or bushes.

Another common use of such selective herbicides is its use to kill a majority of the weeds, particularly the broadleaf weeds, in irrigation ditches and in roadside ditches and along fence lines without however damaging nearby broadleaf crops such as alfalfa, beans, or sugar beets.

It is a further object of this invention to proivde a device which will enable one to apply a selective herbicide to ditches and other relatively inaccessible areas which are now presently sprayed with attendant danger to nearby crops, or which are not now treated because of this danger.

These and other aspects of my invention will be more thoroughly understood in the light of the following description and the drawings in which.

Figure 5:

FIGURE 5 describes an alternate distribution means consisting of a tube having walls of a porous material. Such material could be porous metal or plastic.

Figure 6:
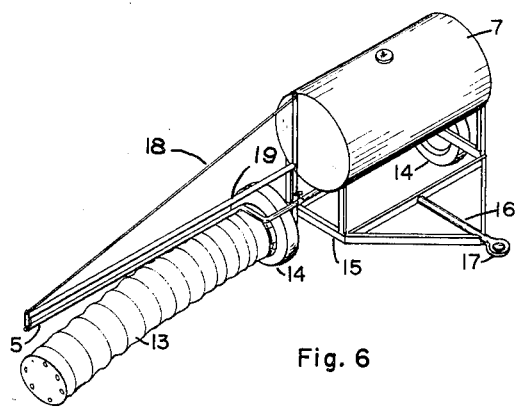

FIGURE 6 is an embodiment of my invention which woud be drawn by a tractor or other power equipment (not shown) and which would be particularly useful for the application of an herbicide to ditches, along fence rows, and the like.

Figure 1:
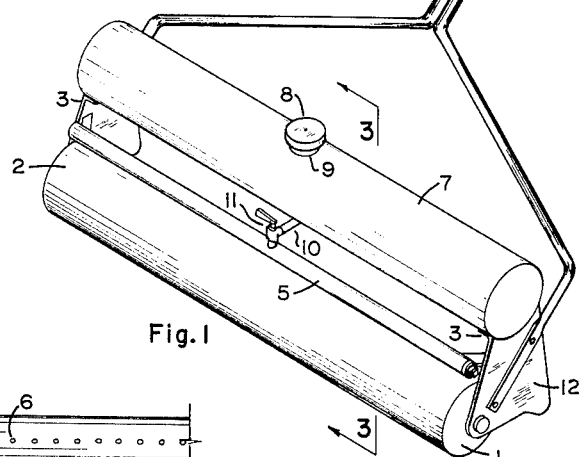
FIGURE 1 is an embodiment of my invention which will more particularly fulfill the requirement for a manually operated device which can be pushed or pulled by an individual much as a hand lawn mower is pulled or pushed.

A preferred embodiment of my invention as shown in FIGURE 1 consists of a horizontal cylindrical roller 1 which is covered with an absorbent material 2. Suitable absorbent materials might consist of a fibrous material such as felt or a porous material such as plastic foam. The roller 1 is supported at each end by supports 3 which also serve to support the fluid reservoir 7. The supports 3 are in turn attached to the extended arms of the handle 4. Located directly above and parallel to the axis of roller 1 is a distribution means 5 which preferably comprises a perforated or porous tube. The reservoir 7 is located at an elevation above the distribution means 5. The reservoir 7 is provided at the top side with an access opening 9 for filling with herbicide solution and a cap 8 for covering the access opening. A conduit 10 with a valve 11 leads from the reservoir 7 to the distribution means 5, thus providing a passage and control for the flow of herbicide solution from the reservoir 7 to the distribution means 5. An extension 12 of the supports 3 will rest on the ground and provides support for the apparatus to remain in a vertical or nearly vertical position when not in use, so that fluid will not drain out through access opening 9.

Figure 2:
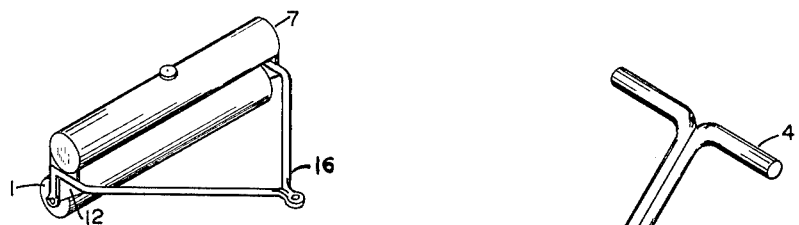
FIGURE 2 shows an alternate embodiment of my invention which is adapted for pulling directly behind a tractor or other type of pulling device.

FIGURE 2 shows an alternate embodiment of my invention similar to that described in FIGURE 1 but which is adapted for towing by a tractor or similar vehicle by means of tow bar 16.

Figure 3:
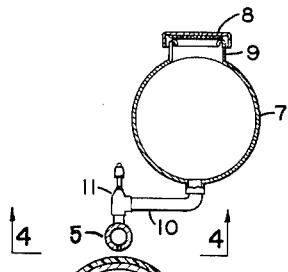
FIGURE 3 is a sectional view taken from FIGURE 1 which more clearly describes the arrangement and function of the components of my invention.

FIGURE 3 shows a sectional view taken from FIGURE 1 which more clearly shows the arrangement and orientation of the components. The cylindrical roller 1 is covered with absorbent material 2. Located directly above the roller 1 is the distribution means 5. Leading from the distribution means 5 to the reservoir 7 is a valve 11 and a conduit 10. An opening 9 for filling the reservoir 7 with herbicide solution and a cover 8 for the opening are also shown in this figure.

Figure 4:
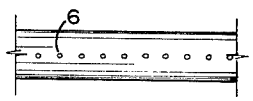
FIGURE 4 is a detailed view of a suitable distribution means showing a perforated tube.

FIGURE 4 depicts a sectional view from FIGURE 3 which shows the details of the preferred device for the distribution means 5 which comprises a tube with perforations 6.

FIGURE 5 depicts a sectional view from FIGURE 3 which shows an alternate device for the distribution means 5 which comprises a tube with porous walls.

FIGURE 6 depicts an alternate embodiment of my invention which is adapted for the application of herbicide to areas such as irrigation and highway ditches. A corrugated flexible roller 13 is attached to one of a pair of wheels 14. A reservoir 7 has a conduit and valve leading to a distribution means 5 which is supported by a support device 18 and boom 19. The support frame 15 maintains the reservoir, wheels and roller in fixed relation to each other. A tongue 16 and hitch 17 provides for towing by a tractor or other suitable vehicle (not shown).

Operation of the system shown in FIGURE 1 would consist of filling the reservoir 7 with the desired concentration of herbicide solution through opening 9 with valve 11 closed. The device could then be rolled or carried to the area to which the herbicide is to be applied. At this point valve 11 would be opened and herbicide solution would commence to flow through conduit 10 and valve 11 to the distribution means 5 where the solution would drip more or less evenly onto the absorbent cover 2 which covers the cylindrical roller 1. The absorbent material would serve to conserve fluid and further distribute the fluid onto the roller 1 more evenly. The roller surface and the absorbent material would then be maintained in a damp or wet condition. The operator would then roll the roller over the area to be treated with weed killer. The wetted roller would come in contact with the leaves of the grass and broadleaf plants with a resulting transfer of herbicide solution to such leaves and if the herbicide used were a 2,4, D type compound would result in killing of the broadleaf weeds. With this device the operator has exceptional control over the application of the herbicide and can safely apply herbicide to sections of a lawn for example that are only an inch or two from desired flowering plants or shrubbery without fear of damage to such broadleaf plants. In addition the operator can push the roller under shrubs or small trees and thus kill weeds growing close to the trunks without damage to such shrubs or trees.

Operation of the system shown in FIGURE 6 would consist of filling the reservoir 7 with the desired amount and concentration of herbicide solution with valve closed. When the herbicide is to be applied the valve is opened and fluid runs through the conduit to distribution means 5 and thence drips onto the absorbent cover 2 which further distributes the fluid and the roller and absorbent media remains damp or wet. The flexible roller 13 is then drawn over the area to be treated and the wet roller transfers heribicide to the plants with which it comes in contact. The flexibility of the roller permits the roller to follow irregular contours and ditches with varying contours and thus provides intimate contact between the roller and the foliage for all types of terrain. Such terrain would normally be inaccessible with a rigid cylindrical roller or with a cylindrical roller drawn directly behind a tractor or other means for pulling the device.

Typical roller dimensions for the device shown in FIGURE 6 might be of the order of 18 to 36 inches in diameter with lengths varying up to 8 to 12 feet. The large diameter would enable the roller to roll readily over the taller weeds which are usually found in ditches and other such areas to be treated with this device. The dimensions of the roller for the device shown in FIGURE 1 might be from 24 to 36 inches in length with a diameter from 3 to 8 inches. Such a size could be easily handled by one individual. The reservoir for this system might be of the order of 1 to 5 gallons, while the capacity of the reservoir for the system shown in FIGURE 6 would be of the order of 25 to 500 gallons.

The embodiment of my invention shown in FIGURE 2 would operate in a manner similar to that described for FIGURE 1, but would be especially suitable for use on large accessible areas such as golf courses, parks, and cemeteries.

Although the foregoing describes the preferred embodiments of my invention, variations which would also be suitable would consist of a device with a roller but without an absorbent cover. A further variation might consist of a valve with an extended handle to facilitate operation by an operator without stooping.

Two methods are presently commonly employed for the application of selective herbicides. The most common of these, as has already been mentioned, consists of spraying wherein little control over the application of the herbicide is possible. The other method consists of consumable rigid bar of solid material such as wax in which is suspended an herbicide chemical. This device is then pulled over the area to be treated such as a lawn. Both of these lack the features employed in my invention. As mentioned earlier the spray method lacks the desired control while the latter method is expensive and does not allow for the high degree of precision application provided by my invention. Furthermore, the latter would not be effective in areas containing higher weeds as the bar would catch on big weeds and then skip over lower areas. In addition a bar will not provide as nearly good contact with the weeds as can be obtained by a wetted roller. A further advantage of my invention over the spray method is that this device will use less solution to cover a given area to be covered. This is of relatively little consequence for use on small plots, but for large areas such as golf courses, parks, and farm fields it results in considerable savings of herbicide solution. With the device of my invention the fluid flows from the reservoir onto the roller and then is imparted to the leaves by the force of gravity thus no additional power is required as in the case of a spray type applicator of the prior art. Since many sprayers for lawn application are used in conjunction with a hose and utilize the power from the household water supply to operate the sprayer their range of use is limited by the length of hose available. The various embodiments of my invention which utilize only gravity flow is not subject to this limitation.

Changes and modifications may be availed of within the spirit and scope of the hereunto appended claims.

I claim:

1. An herbicide applicator comprising a cylindrical horizontal roller with supports at each end, said supports attached to a handle or pull bar with said handle or pull bar protruding in a direction perpendicular to the axis of the cylinder, a fluid distribution means located above and parallel to said cylinder roller and supported independently of said roller, a reservoir for fluid storage located at an elevation above the distribution means, a conduit leading from said storage reservoir to said distribution means with said conduit provided with a valve for regulating the flow of herbicide solution.

2. The invention according to claim 1 wherein the cylinder is covered with a fluid absorbing material.

3. The invention according to claim 1 wherein the fluid reservoir is supported on the handle of the applicator.

4. The invention according to claim 1 wherein the distribution means comprises a tube with perforations along its length.

5. The invention according to claim 1 wherein the distribution means comprises a tube having porous walls.

6. An herbicide applicator comprising a cylindrical horizontal roller with supports at each end, said supports attached to a pushing or pulling means, said pushing or pulling means protruding in a direction perpendicular to the axis of the cylinder, a fluid distribution means located above and parallel to the axis of said cylindrical roller and supported independently of the cylindrical roller and a conduit leading from a remotely located source of fluid to said distribution means.

7. An herbicide applicator comprising a flexible horizontal cylindrical roller supported at one end by a wheel of a pair of wheels with the axis of the roller being an extension of the axis of the supporting pair of wheels, said roller and wheels so arranged on a framework with a tongue and hitch so that when the wheels trail a tractor or other pulling device the roller will roll over an area offset from that driven over by the tractor, a fluid distribution means located above and along the axial length of the roller, a reservoir for fluid storage located at an elevation above the distribution means, a conduit leading from said reservoir to said distribution means and provided with a valve for controlling the flow of fluid.

8. An herbicide applicator comprising a flexible horizontal cylindrical roller supported at one end by a wheel of a pair of wheels with the axis of the roller being an extension of the axis of the supporting pair of wheels, said roller and wheels arranged on a framework with a tongue and hitch so that when the wheels trail a tractor or other pulling device the cylinder roller will roll over an area offset from that driven over by the tractor, a fluid distribution means located above and along the axial length of the roller and a conduit leading from a remotely located source of fluid to said distribution means.

9. The invention according to claim 8 wherein the fluid is supplied by a pump.

10. The invention according to claim 7 wherein the cylindrical roller is covered with a fluid absorbing material.

11. The invention according to claim 7 wherein the distribution means is a perforated tube.

12. The invention according to claim 7 wherein the distribution means is comprised of a tube with porous walls.

13. The invention according to claim 7 wherein the flexible cylinder roller is comprised of corrugated tubing.

14. An herbicide applicator comprising a cylindrical horizontal roller with supports at each end, said supports attached to a tongue and hitch with tongue and hitch protruding in a direction perpendicular to the axis of the cylindrical roller, a fluid distribution means located above and parallel to said roller and supported independently of said cylinder, a reservoir for fluid storage located at an elevation above the distribution means, a conduit leading from said storage reservoir to said distribution means, said conduit provided with a valve for regulating the flow of herbicide solution.

15. An herbicide applicator comprising a cylindrical horizontal roller, means for supporting said roller, a fluid distribution means located above and parallel to the axis of said cylinder, means for holding herbicide solution, means for supplying herbicide solution from said storage means to said distribution means and a valve for controlling the flow of herbicide solution.

References Cited by the Examiner

UNITED STATES PATENTS

| | | | |
|---|---|---|---|
| 1,764,952 | 6/1930 | Hay | 47—1.5 |
| 2,654,107 | 10/1953 | Magoon | 15—575 |
| 2,898,618 | 8/1959 | Whitfield et al. | 15—575 |
| 3,135,006 | 6/1964 | Leland | 15—577 |
| 3,152,353 | 10/1964 | Cravener | 222—176 X |

LOUIS J. DEMBO, *Primary Examiner.*

CHARLES R. CARTER, RAPHAEL M. LUPO,
*Examiners.*